United States Patent [19]
Davis

[11] 3,851,895
[45] Dec. 3, 1974

[54] DRAWBAR STEERING ATTACHMENT FOR ARTICULATED TRACTORS

[76] Inventor: Maurice E. Davis, Rt. 2, Box 136, Moscow, Idaho 83843

[22] Filed: May 21, 1973

[21] Appl. No.: 361,969

[52] U.S. Cl. ............... 280/467, 180/51, 180/79.2 B, 280/448
[51] Int. Cl. ............................................. B62d 13/00
[58] Field of Search ......... 180/51, 14 R, 52, 79.2 R, 180/79.2 B; 280/467, 468, 419, 400, 448

[56] References Cited
UNITED STATES PATENTS
3,455,408  7/1969  Larsen ............................ 180/79.2 B
3,662,848  5/1972  Magnusson ......................... 180/51

Primary Examiner—Leo Friaglia
Attorney, Agent, or Firm—Wells, St. John & Roberts

[57] ABSTRACT

A drawbar steering attachment for articulated tractors of the type having a forward section hinged to a rearward section and steered by pivoting the two sections relative to each other. It comprises a non-extensible cable fixed at two transverse points to the forward tractor section and extending rearwardly therefrom to opposite sides of a drawbar pivotably mounted on the rear section. The cable automatically pivots the drawbar in response to relative pivotal movement of the two tractor sections. This pivotal movement serves to shift the turning radius of a drawn implement selectively inward or outwardly with respect to the moving path of the tractor.

10 Claims, 5 Drawing Figures

PATENTED DEC 3 1974

DRAWBAR STEERING ATTACHMENT FOR ARTICULATED TRACTORS

BACKGROUND OF THE INVENTION

The recent development of tractors that are steered by forcibly pivoting a front wheel supported section relative to a rear wheel supported section has created some difficulty in the agriculture industry in that the reduced turning radius of the tractors sometimes prohibits the use of drawn implements which would normally cover a wide swath of ground. When using such tractors the implement tends to whip back and forth behind the tractor while turning, possibly damaging the implement. At other times, it is desirable that the pulled implement be controlled so as to turn in a path tighter than that of the tractor.

It is therefore desirable to provide means for shifting the turning radius of the drawn implement outward or inward as the tractor is turned. This is accomplished in the present invention by means of an attachment connected between the articulated tractor sections and the tractor drawbar. The attachment is utilized to automatically pivot the drawbar to one side or the other of the centerline of the rear section in response to relative pivotal movement of the front tractor section and the rear tractor section. By pivoting the tractor drawbar as the tractor is turned, the turning radius of the drawn implement may be either shifted into or away from the turning radius of the tractor.

SUMMARY OF THE INVENTION

A drawbar steering attachment is described for tractors of the type having a forward wheel supported section and a rearward wheel supported section hinged together about a vertical axis and steered by pivoting the forward and rearward sections relative to one another, said rearward section also including a drawbar pivotably mounted thereon. The attachment includes a detection means for sensing relative pivotal movement of the two hinged tractor sections and transmitting means connected between the detection means and the drawbar for automatically imparting pivotal movement to the drawbar in response to relative pivotal movement of the tractor sections. The apparatus further includes means for selectively reversing the directional movement of the drawbar in response to relative pivotal movement of the forward and rearward tractor sections.

It is a first object of my invention to provide an attachment for articulated tractors that will automatically pivot the drawbar in response to pivotal movement of the articulated tractor sections and thereby shift the turning radius of a drawn implement selectively toward or away from the turning radius of the tractor.

It is another object of my invention to provide such an attachment that is readily mountable to existing articulated tractors.

It is a further object of my invention to provide such an attachment that is relatively simple in construction and therefor inexpensive to manufacture.

These and further objects and advantages will become evident upon reading the following disclosure which, taken with the accompanying drawings, describe a preferred form of the invention.

A BRIEF DESCRIPTION OF THE DRAWINGS

DETAILED DESCRIPTION OF A PREFERRED EMBODIMENT

Figure 1:
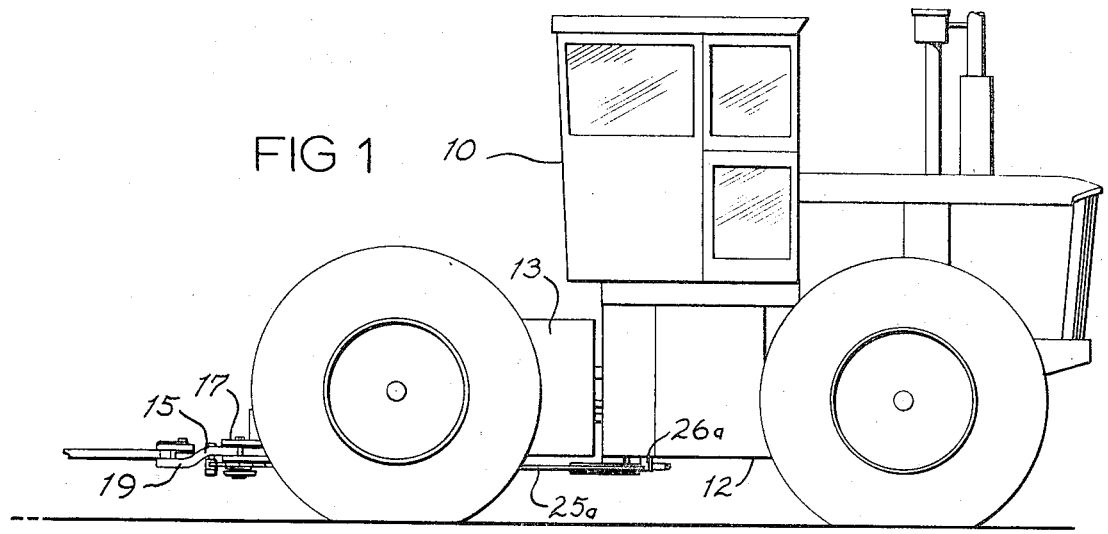
FIG. 1 is a side elevational view of an articulated tractor with the drawbar steering attachment mounted thereto.
Figure 4:
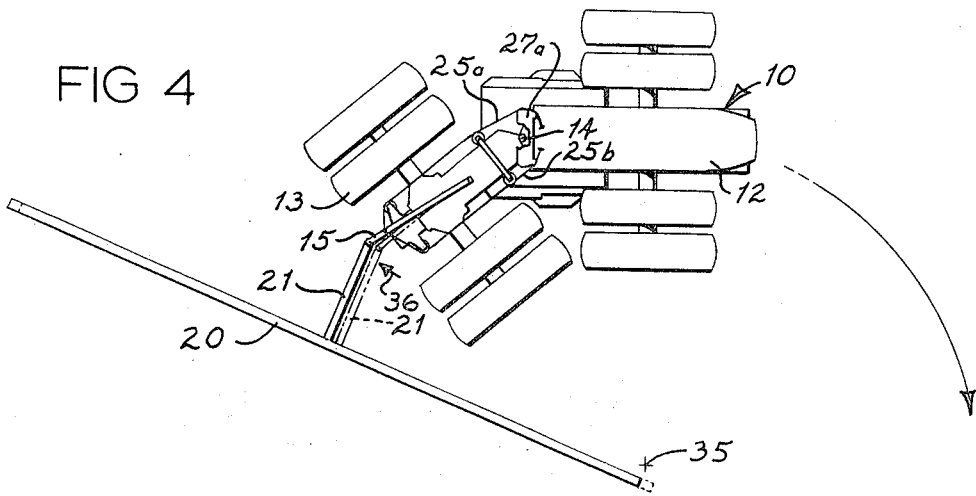
FIGS. 4 and 5 are bottom schematic operational views of the attachment with a tractor and an implement.
Figure 5:
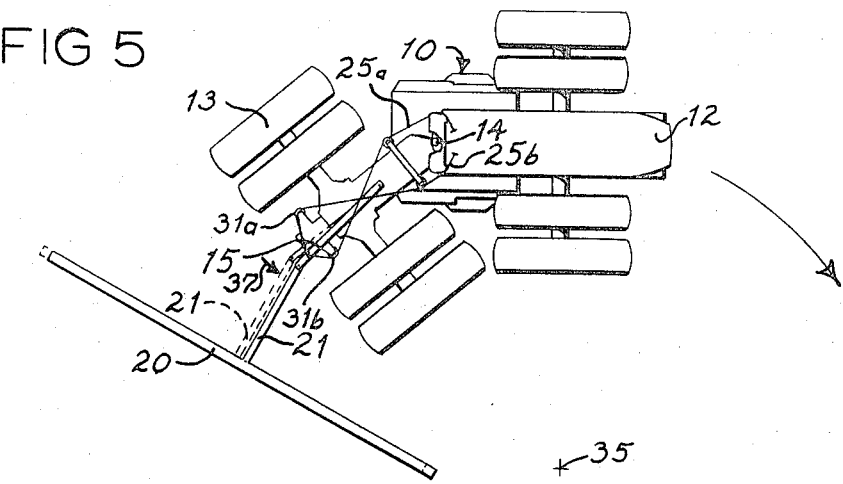

An articulated tractor 10 (FIG. 1) comprises a front tractor section 12 pivotably connected to a rear tractor section 13 by means of a central pivot 14 that defines a vertical steering axis. The steering axis is located at the point of intersection of the longitudinal centerline of rear tractor section 13 and the centerline of front tractor section 12. The tractor 11 is steered by forcefully pivoting the sections relative to one another as shown in FIGS. 4 and 5. This is accomplished by means of hydraulic cylinders (not shown) that are actuated by turning the tractor steering wheel. Power is usually supplied to all ground engaging wheels of such tractors to assure greater traction and to assist in towing operations.

Figure 2:
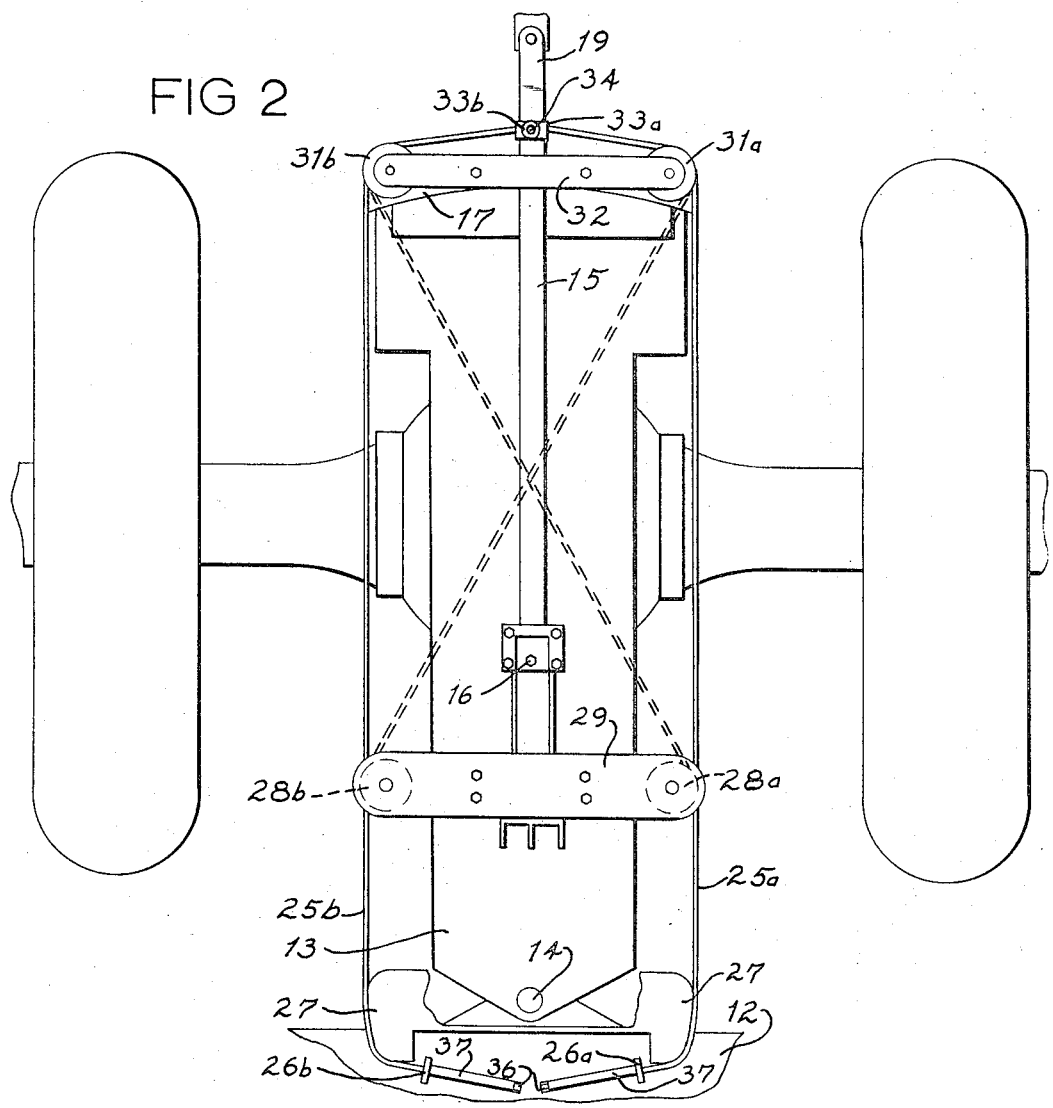
FIG. 2 is a bottom view of the attachment mounted to the rearward section of the tractor shown in FIG. 1.
Figure 3:
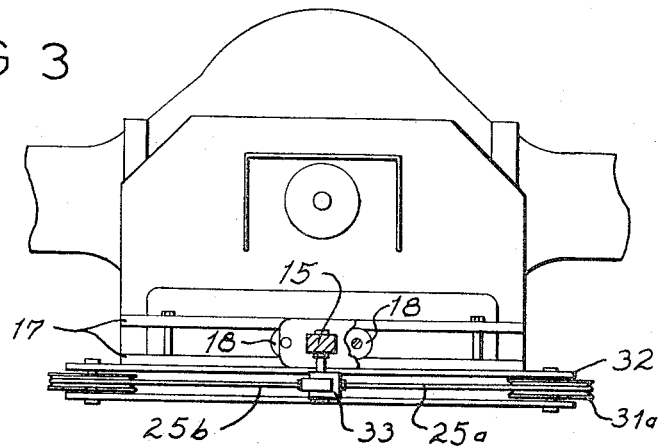
FIG. 3 is a fragmentary end view of the attachment shown in FIG. 2.

The rear tractor section 13 (FIG. 2) includes a drawbar 15 pivotably mounted to the underside thereof by a pivot pin 16, defining a drawbar axis intersecting the centerline of rear tractor section 13. The rearward end of the drawbar 15 is held within a horizontal guide 17 which allows the drawbar to pivot about the vertical axis of pivot pin 16 on guide rollers 18 (FIG. 3). The rearward end of the drawbar 15 includes a hitch mechanism 19 (FIG. 1) that facilitates connection of the tractor to drawn implements such as the one schematically shown in FIGS. 4 and 5 by the reference numeral 20. Such implements usually include a forwardly extending tongue 21 which includes means for mounting the implement to the hitch 19.

The drawbar steering attachment basically comprises two lengths of flexible cable 25a, 25b extending rearwardly from stationary mounting brackets 26a and 26b respectively on the front tractor section 12 rearwardly to the drawbar 15. Brackets 26a, 26b are located on section 12 at positions equally spaced at opposite sides of its centerline. Looking at FIG. 2, the first length of cable 25a extends from a bracket 26a rearwardly over a laterally projecting shoulder 27 mounted to the front tractor section 12. The shoulder 27 is formed on a radius from the hinge axis of the two tractor sections. The cable length extends rearwardly from the shoulder 27 toward the rear tractor section 13 to engage a forward sheave 28a pivotably mounted to the rear tractor section 13 by mounting plates 29 for free rotational movement about an axis parallel to the steering and drawbar axes. The cable passes over sheave 28a and extends rearwardly to a rearward sheave 31a. Sheave 31a is also mounted to the rear tractor section 13 by means of a mounting plate 32 for free pivotal movement about an axis parallel to the steering and drawbar axes. The cable then extends from sheave 31a to a rearward end which is mounted to the drawbar 15 by means of a shackle 33a and pin 34.

The second length of cable 25b extends from a mounting bracket 26b over shoulder 27. Cable length 25b then extends rearwardly from the shoulder 27 to a sheave 28b that is mounted to the rearward tractor section 13 for free rotational movement about an axis parallel to the steering and drawbar axes by means of mounting plate 29. The cable length 25b extends on rearwardly from sheave 28b to a second sheave 31b which is fixed by mounting plate 32 to the rearward tractor section 13 for free rotation about an axis parallel to the steering and drawbar axes. Cable length 25b then extends from the sheave 31b to the drawbar 15 where it is mounted to pin 34 by means of a shackle 33b.

The portions of cables 25a and 25b that extend between the brackets 26a and 26b and sheaves 28a and 28b may be described as a detection means for sensing relative pivotal movement between the tractor sections. The remaining rearward sections extending between sheaves 28a and 28b to the drawbar may be considered transmitting means for transmitting relative pivotal movement of the tractor sections in the drawbar.

The attachment includes means for varying cable length at each side of the assembly. A set of spacer sleeves 37 is mounted to the forward ends of the two lengths of cable 25a, 25b ahead of the mounting brackets 26a, 26b. The ends of the cable are threaded to receive end caps 36 which then permits the user to selectively remove the spacer sleeves 37, thereby lengthening the cable at each side. The lengthened cable may then be crossed as is shown by dotted lines in FIG. 2 to facilitate pivotal movement of the drawbar 15, opposite to that movement which would be imparted to the drawbar by the cables when arranged as previously described. In the crossed condition, the right length of cable 25a extends over sheave 28a rearwardly to the left sheave 31b and subsequently back to the drawbar 15. The left length of cable 25b then extends over sheave 28b rearwardly to sheave 31a and back to the drawbar 15.

Operation of the drawbar steering attachment may best be seen with reference to FIGS. 4 and 5. In FIG. 4, the cable lengths 25a and 25b are arranged so that the drawbar 15 is turned outward relative to the centerline of rear tractor section 13 as the tractor is turned about a center as shown at 35 in FIG. 4. As the tractor sections turn about center 35, the distance between the pin 34 on the drawbar 15 and the bracket 26a holding cable section 25a is lengthened relative to the distance between the pin 34 and the mounting bracket 26a which mounts the cable section 25b. Since the cables 25a, 25b are non-extensible, the drawbar is pivoted in the direction indicated by the arrow 36 in FIG. 4. The resulting position of the towed implement 20 is shown in solid lines. The dashed lines in FIG. 4 designate the relative position of the implement if the attachment were not utilized and the drawbar were fixed along the normal centerline of the tractor. The movement of drawbar 15 serves to shift the inside end of the implement away from the center point 35 of the turning radius of the tractor.

The operation of the attachment with the cables in the crossed condition is shown in FIG. 5. The attachment is utilized in this condition for implements that are relatively narrow and not extending outwardly from the tool bar 21 past the turning center 35 of the tractor. With such implements the tractor and implement may be turned about a relatively short radius. It is therefore desirable that the drawbar 15 be pivoted inwardly toward the center point 35 of turning radius of the tractor. This is done as the tractor is turned and the distance between the pin 34 and mounting bracket 26a is lengthened relative to the distance between pin 34 and the mounting bracket 26b. However, since the cables are crossed, the drawbar is pivoted oppositely, in the direction indicated by the arrow 37 in FIG. 5.

It may be obvious from the above description and the attached drawings that various changes and modifications may be made therein without departing from the intended scope of this invention. It is therefore intended that only the following claims define this invention.

What I claim is:

1. An attachment for tractors of the type having a front wheel-supported tractor section having a longitudinal centerline and a rear wheel supported tractor section having a longitudinal centerline, said front and rear tractor sections being hinged to one another about a vertical steering axis at the intersection of their respective centerlines, means for steering the tractor by articulation of the front and rear tractor sections about the steering axis, and a drawbar extending rearwardly from a pivotal connection to the rear tractor section about a vertical drawbar axis intersecting the centerline of the rear tractor section, said attachment comprising:

first and second lengths of flexible cable, each anchored at one end to the front tractor section and extending rearwardly from locations equally spaced at opposite sides of the centerline of the front tractor section;

first and second guide means mounted to the rear tractor section in transverse alignment with one another at locations rearward of the drawbar axis and equally spaced at opposite sides of the centerline of the rear tractor sections;

said first and second lengths of flexible cable being movably entrained about said first and second guide means respectively, each of said first and second lengths of flexible cable being taut and having its remaining end fixed to the drawbar at a common location rearward of the drawbar axis.

2. The device as set out in claim 1 wherein the first and second lengths of cable each extend from a location to one side of the centerline of the front tractor section respectively corresponding to the location of the first and second guide means relative to the centerline of the rear tractor section.

3. The device as set out in claim 1 wherein the first and second lengths of cable each extend from a location to one side of the centerline of the front tractor section respectively opposite to the respective locations of the first and second guide means relative to the centerline of the rear tractor section.

4. The device as set out in claim 1 wherein the first and second guide means comprises:

individual rotatable sheaves mounted onto the rear tractor section about vertical sheave axes equally spaced at opposite sides of the centerline of the rear tractor section.

5. The device as set out in claim 1 wherein each length of flexible cable includes means for adjusting the length thereof to maintain the length of cable in a taut condition between the drawbar and front tractor section.

6. The device as set out in claim 1 further comprising:

third and fourth guide means mounted to the rear tractor section in transverse alignment with one another at locations rearward of the first and second guide means respectively and equally spaced at opposite sides of the centerline of the rear tractor section;

said first and second lengths of the flexible cable being movably entrained about said third and fourth guide means respectively.

7. The device as set out in claim 1 further comprising:

third and fourth guide means mounted to the rear tractor section in transverse alignment with one another at locations rearward of the first and second guide means respectively and equally spaced at opposite sides of the centerline of the rear tractor section;

said first and second lengths of flexible cable being movably entrained about said fourth and third guide means respectively.

8. An attachment for tractors of the type having a front wheel-supported section and a rear wheel-supported section hinged to one another about a vertical steering axis, articulated steering means for steering the tractor by forcibly pivoting the front and rear sections relative to one another about the steering axis, and a rearwardly extending drawbar pivotably mounted to the rear section about a vertical drawbar axis, said attachment comprising:

a flexible cable having a portion thereof extending from one cable end mounted to the front tractor section, around a forward sheave rotatably mounted about an axis parallel to the steering axis to the rear tractor section, around a rearward sheave rotatably mounted to the rear tractor section about an axis parallel to the steering axis and laterally spaced from the drawbar, to a rearward end pivotably mounted to the drawbar at a location rearward of the drawbar axis.

9. The apparatus set out in claim 8 further comprising a second cable pivotably mounted at a forward end to the front tractor section at a location thereon laterally spaced from said one end at the opposite side of the steering axis and extending rearwardly therefrom to a tangential point of contact on a second forward sheave freely rotatably mounted to the rear tractor section for free rotation about an axis parallel to the hinge axis and laterally spaced from the first-named forward sheave, and on rearwardly over a second rearward sheave mounted to the rearward tractor section for free rotation about an axis parallel to the steering axis and laterally spaced from the rearward sheave with the drawbar located therebetween, and finally on to a second rearward end pivotably mounted to the drawbar at a location rearward of the drawbar axis.

10. The apparatus defined in claim 9 further comprising length adjusting means operatively connected to said cables to facilitate length adjustment of the cables thereby enabling the cables to be selectively crossed between the forward and rear sheaves.

* * * * *